United States Patent
Lv et al.

(10) Patent No.: US 12,267,164 B2
(45) Date of Patent: Apr. 1, 2025

(54) WIRELESS DATA COMMUNICATION METHOD AND DEVICE, STORAGE MEDIUM AND ELECTRONIC DEVICE

(71) Applicant: ZTE Corporation, Shenzhen (CN)

(72) Inventors: Jianfeng Lv, Shenzhen (CN); Ning Wei, Shenzhen (CN); Nan Li, Shenzhen (CN); Bo Sun, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 969 days.

(21) Appl. No.: 17/289,919

(22) PCT Filed: Oct. 17, 2019

(86) PCT No.: PCT/CN2019/111669
§ 371 (c)(1),
(2) Date: Apr. 29, 2021

(87) PCT Pub. No.: WO2020/088261
PCT Pub. Date: May 7, 2020

(65) Prior Publication Data
US 2022/0006565 A1 Jan. 6, 2022

(30) Foreign Application Priority Data
Nov. 1, 2018 (CN) .......................... 201811297227.1

(51) Int. Cl.
*H04L 1/00* (2006.01)
*H04B 17/336* (2015.01)
(52) U.S. Cl.
CPC .......... *H04L 1/0071* (2013.01); *H04B 17/336* (2015.01); *H04L 1/0003* (2013.01)

(58) Field of Classification Search
CPC . H04L 1/10; H04L 1/04; H04L 1/0626; H04L 1/0003; H04L 1/001; H04L 1/0071; H04B 17/336
See application file for complete search history.

(56) References Cited

U.S. PATENT DOCUMENTS

| 2005/0152327 | A1 | 7/2005 | Erlich |
| 2007/0140364 | A1 | 6/2007 | Ouyang |

(Continued)

FOREIGN PATENT DOCUMENTS

| CN | 1742450 A | 3/2006 |
| CN | 101778394 A | 7/2010 |

(Continued)

OTHER PUBLICATIONS

International Search Report for corresponding application PCT/CN2019/111669 filed on Oct. 17, 2019; Mail date Jan. 15, 2020.

(Continued)

*Primary Examiner* — Melvin C Marcelo
(74) *Attorney, Agent, or Firm* — CANTOR COLBURN LLP

(57) ABSTRACT

Provided are a wireless data communication method and device, a storage medium and an electronic device. The method includes: performing an interleaving operation on first elements in a first data set and second elements in a second data set, wherein the interleaving operation includes: arranging the first elements and the second elements such that there is exchange of data between at least a part of the first elements and at least a part of the second elements, the first data set belongs to a first frequency band, the second data set belongs to a second frequency band, and there is at least one second frequency band.

17 Claims, 4 Drawing Sheets

(56) References Cited

U.S. PATENT DOCUMENTS

| | | | |
|---|---|---|---|
| 2008/0310526 A1 | 12/2008 | Maltsev | |
| 2012/0287871 A1* | 11/2012 | Marini | H04L 5/0007 370/329 |
| 2017/0273083 A1 | 9/2017 | Chen | |
| 2018/0110048 A1* | 4/2018 | Ang | H04L 5/0055 |

FOREIGN PATENT DOCUMENTS

| | | |
|---|---|---|
| CN | 102124809 A | 7/2011 |
| CN | 102857464 A | 1/2013 |
| CN | 103329447 A | 9/2013 |
| CN | 106233650 A | 12/2016 |
| CN | 107046451 A | 8/2017 |

OTHER PUBLICATIONS

The search report of counterpart PCT application No. PCT/CN2019/111669 was issued on Jan. 15, 2020.

The first search report of counterpart CN application No. 2018112972271 was issued on Nov. 19, 2021.

"Ericsson.""R4-154558:Emissions requirements for multi-band AAS BS" 3GPP TSG-RAN WG4 Meeting #76,Aug. 28, 2015.

The second office action of counterpart KR application No. 10-2021-7016770 was issued on Apr. 4, 2023.

* cited by examiner

Performing an interleaving operation on first elements in a first data set and second elements in a second data set; wherein the interleaving operation includes: arranging the first elements and the second elements such that there is exchange of data between at least a part of the first elements and at least a part of the second elements; the first data set belongs to a first frequency band, the second data set belongs to a second frequency band, and there is at least one second frequency band    S102

Fig. 1

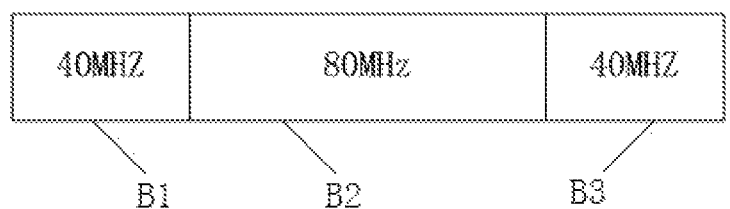

Fig. 2

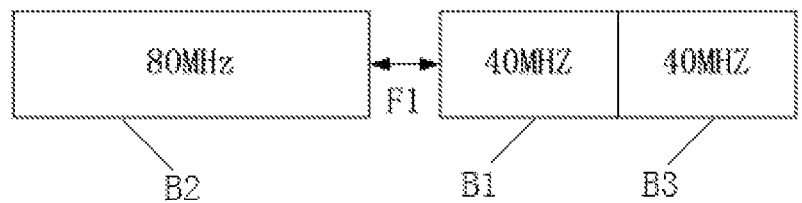

Fig. 3

WIRELESS DATA COMMUNICATION METHOD AND DEVICE, STORAGE MEDIUM AND ELECTRONIC DEVICE

CROSS REFERENCE

This application is a National Stage Filing of the PCT International Application No. PCT/CN2019/111669 filed on Oct. 17, 2019, which claims priority to the Chinese Application No. 201811297227.1 filed on Nov. 1, 2018, the entirety of which is herein incorporated by reference.

TECHNICAL FIELD

The present disclosure relates to, but is not limited to, the field of communications.

BACKGROUND

With the increasing shortage of spectrum resources, it is difficult to obtain a relatively large continuous bandwidth in an existing spectrum below 5 GHz. However, users of wireless devices have a great demand on a throughput rate of data transmission on the wireless devices. For the foregoing demand, as one of commonly used methods for increasing the throughput rate of the data transmission on wireless devices, a relatively large bandwidth is simulated by combining a plurality of frequency bands with small bandwidth, thereby improving the throughput rate of the data transmission on wireless devices. Meanwhile, with the release of the 6 GHz frequency band, the wireless devices are likely to obtain a larger bandwidth by combining the existing 5 GHz frequency band with the 6 GHz frequency band to be released by using a corresponding multi-frequency band (namely, by using two or more frequency bands) data transmission technology, and transmit data by using the combined large bandwidth, thereby further improving the throughput rate of the data transmission.

Generally, when a wireless device uses a large bandwidth for transmission, better channel conditions are required to ensure proper transmission. However, it is relatively difficult to achieve good channel conditions in a daily operating environment of the wireless device, therefore it is desired to lower the requirements of a wireless communication system on channel conditions as much as possible, under the premise that the performance of the wireless device using a large bandwidth for data transmission remains unchanged. With regard to a channel state, frequency selective fading is an important factor affecting channel conditions, and enhancing the resistance of a wireless communication system against the frequency selective fading of signals can lower the requirements on the channel conditions when the system uses a large bandwidth for transmission, thereby improving the overall performance of the wireless communication system.

SUMMARY

The embodiments of the present disclosure provide a wireless data communication method and device, a storage medium and an electronic device.

According to an embodiment of the present disclosure, a wireless data communication method is provided. According to the method, an interleaving operation is performed on first elements in a first data set and second elements in a second data set, wherein the interleaving operation includes: arranging the first elements and the second elements such that there is exchange of data between at least a part of the first elements and at least a part of the second elements, the first data set belongs to a first frequency band, the second data set belongs to a second frequency band, and there is at least one second frequency band.

According to another embodiment of the present disclosure, a wireless data communication device is provided. The device includes: an interleaving module, configured to perform an interleaving operation on first elements in a first data set and second elements in a second data set, wherein the interleaving operation includes: arranging the first elements and the second elements such that there is exchange of data between at least a part of the first elements and at least a part of the second elements, the first data set belongs to a first frequency band, the second data set belongs to a second frequency band, and there is at least one second frequency band.

According to still another embodiment of the present disclosure, a storage medium is provided. The storage medium stores a computer program, wherein the computer program, when being executed, implements operations in any of the above method embodiments.

According to still another embodiment of the present disclosure, an electronic device is provided. The electronic device includes a processor and a memory, wherein the memory stores a computer program, and the processor is configured to execute the computer program to implement operations in any of the above method embodiments.

BRIEF DESCRIPTION OF THE DRAWINGS

The accompanying drawings described herein are used to provide a deeper understanding of the present disclosure, and constitute a part of the present application. The exemplary embodiments of the present disclosure and the description thereof are used to explain the present disclosure. The drawings and the exemplary embodiment do not constitute limitations to the present disclosure. In the drawings:

FIG. 1 is a flowchart of a wireless data communication method according to an embodiment of the present disclosure;

FIG. 2 is a schematic diagram of continuous distribution of multiple frequency bands in a spectrum according to an embodiment of the present disclosure.

FIG. 3 is a schematic diagram of partially-continuous distribution of multiple frequency bands in a spectrum according to an embodiment of the present disclosure.

DETAILED DESCRIPTION OF THE EMBODIMENTS

Figure 4:
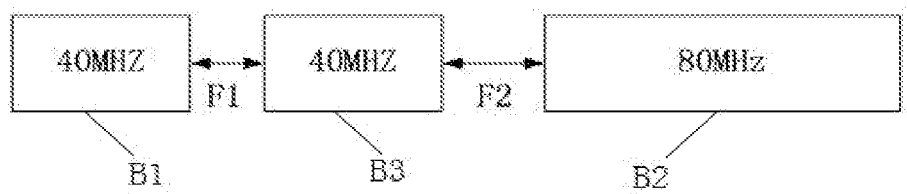
FIG. 4 is a schematic diagram of non-continuous distribution of multiple frequency bands in a spectrum according to an embodiment of the present disclosure.

The present disclosure is described below in detail with reference to the drawings and in conjunction with the embodiments. It is to be noted that embodiments in the present application and characteristics in the embodiments may be combined to derive other embodiments not explicitly described.

It is to be noted that the terms "first", "second" and the like in the specification, the claims and the drawings of the present disclosure are used to distinguish similar objects, and are not used to describe a specific sequence or a precedence order.

A method for a wireless communication system to resist frequency selective fading of channels is to perform an interleaving operation on transmitted data. However, the interleaving operation in the related art is designed for independent frequency bands, and when data is transmitted via multiple frequency bands, data transmitted within each frequency band is independently interleaved, and there is no data exchange between the frequency bands, so that the capability of the interleaving operation to resist frequency selective fading of channels is limited. Concerning the problem in the related art that, when data is transmitted via multiple frequency bands, data among multiple frequency bands cannot be interleaved, no effective solution has been proposed in the related art.

An embodiment of the present disclosure provides a wireless data communication method. FIG. 1 is a flowchart of a wireless data communication method according to an embodiment of the present disclosure. As shown in FIG. 1, the flow includes an operation S102.

In the operation S102, an interleaving operation is performed on first elements in a first data set and second elements in a second data set. The interleaving operation includes: arranging the first elements and the second elements such that there is exchange of data between at least a part of the first elements and at least a part of the second elements. The first data set belongs to a first frequency band, the second data set belongs to a second frequency band, and there is at least one second frequency band.

With the method in the present embodiment, the first elements in the first data set corresponding to the first frequency band and the second elements in the second data set corresponding to the second frequency band can be arranged to implement data exchange, thereby achieving the interleaving operation. The method in the present embodiment solves the problem that when data is transmitted via multiple frequency bands, data among multiple frequency bands cannot be interleaved. Meanwhile, through the data interleaving among the multiple frequency bands, system performance when the wireless device transmits signals via multiple frequency bands can be significantly improved.

The operation of arranging the first elements and the second elements such that there is exchange of data between at least a part of the first elements and at least a part of the second elements in the interleaving operation may have multiple implementations, which include but are not limited to: exchanging all of the first elements with the second elements, that is, arranging all of the first elements into the second data set, and arranging all of the second elements into the first data set; alternatively, swapping a part of the first elements and a part of the second elements, that is, a part of the first elements are arranged in the second data set, and a part of the second elements are arranged in the first data set. Concerning the first elements that are not arranged in the second data set, the following operation may be further performed: re-arranging the remaining first elements in the first data set among one another, or, not directly re-arranging the first elements in the first data set, but inserting the second elements between the remaining first elements in the first data set to complete arrangement.

It should be further noted that the first frequency band and the second frequency band are different frequency bands, and the terms first and second do not necessarily define a specific sequence or order among a plurality of frequency bands. The second frequency band/bands may be a frequency band or a plurality of frequency bands different from the first frequency band. When there is a plurality of frequency bands, the interleaving operation may be performed between the second data set corresponding to any second frequency band and the first data set corresponding to the first frequency band. Furthermore, when the interleaving operation needs to be performed between the second data sets corresponding to a plurality of second frequency bands, any two data sets serving as interleaved operation objects may be redefined as a first data set in a first frequency band and a second data set in a second frequency band, that is, when data interleaving is performed on two or more than two frequency bands, the first frequency band and the second frequency band in the present embodiment are used to represent two frequency bands in which the interleaving operation is to be performed. By defining different frequency bands as the first frequency band and the second frequency band, the data interleaving method in the present embodiment is applicable to data interleaving operations for any number of frequency bands. Therefore, data interleaving of any number of frequency bands belongs to the scope of protection of the present disclosure.

Similarly, the first data set and the second data set are also only used to distinguish different data sets corresponding to different frequency bands, and do not necessarily define a specific sequence or a precedence order among a plurality of data sets. For the first data set which generally includes a plurality of first elements, the first elements are only used for indicating corresponding elements selected in the first data set for the interleaving operation, but are not all elements in the first data set. The second data set and the second elements are to be understood similarly, and details are not repeatedly described herein.

The method in the present embodiment implements data interleaving between different frequency bands. Compared with the related art in which only data within the same single frequency band are interleaved, the method in the present embodiment can improve the depth of data interleaving, so as to further improve the resistance of a wireless communication system against frequency selective fading of signals, thereby reducing the requirements on channel conditions when a system uses large bandwidth for transmission, and improving the overall performance of the wireless communication system.

In addition, all of the plurality of frequency bands for which data interleaving is performed in the present embodiment may be adjacent to each other, or several frequency bands may be adjacent but the several frequency bands are not adjacent to other frequency bands, or none of the plurality of frequency bands may be adjacent to each other.

FIG. 2 is a schematic diagram of continuous distribution of multiple frequency bands in a spectrum according to an embodiment of the present disclosure. FIG. 3 is a schematic diagram of partially-continuous distribution of multiple frequency bands in a spectrum according to an embodiment of the present disclosure. FIG. 4 is a schematic diagram of non-continuous distribution of multiple frequency bands in a spectrum according to an embodiment of the present disclosure. Assuming that a 160 M bandwidth is required for data transmission in a wireless system, and a bandwidth of each frequency band is a multiple of 20 MHz in an actual data transmission process, the 160 M bandwidth may be formed by a plurality of adjacent or non-adjacent frequency bands, for example, formed by a combination of a first frequency band B1 with a bandwidth being 40 M, a second frequency band B2 with a bandwidth being 80 M, and a third frequency band B3 with a bandwidth being 40 M. The three frequency bands may be adjacent to each other, as shown in FIG. 2. The three frequency bands may also consist of two adjacent frequency bands, and one frequency band that is not adjacent to the two adjacent frequency bands, as shown in FIG. 3. Alternatively, none of the three frequency bands is adjacent to each other, as shown in FIG. 4. F1 in FIGS. 3 and F1 and F2 in FIG. 4 are used for representing a frequency interval between frequency bands. The values of F1 and F2 may be any values larger than or equal to 0. When the three frequency bands are adjacent to each other, F1=F2=0. The data interleaving method in the present embodiment is applicable to a plurality of frequency bands in any distribution form, that is, the solution in the embodiment of the present disclosure does not has any limitation on whether the frequency bands are adjacent or not.

In an embodiment, the operation S102 may be, but is not limited to be, executed by an interleaver.

In an embodiment, in the operation S102, the first elements include data bits or subcarrier information elements, and the second elements include data bits and subcarrier information elements. The subcarrier information elements are used for indicating amplitude and/or phase information of one or more subcarriers.

It should be further noted that the subcarrier information elements are obtained according to mapping relationship of the data bits, and are used for indicating amplitude and/or phase of one or more subcarriers. The mapping relationship makes the amplitude and/or phase of the one or more subcarriers correspond to the data bits.

In an embodiment, in the operation S102, when the first elements include the data bits and the second elements include the data bits, before the interleaving operation is performed, the method may further include the following operation. A bitstream is parsed into at least one first data stream and at least one second data stream. The at least one first data stream is used for indicating at least one data stream to be interleaved in the first frequency band, and the at least one second data stream is used for indicating at least one data stream to be interleaved in the second frequency band. The at least one first data stream forms the first data set, and the at least one second data stream forms the second data set.

It should be further noted that the first frequency band may include a plurality of first data streams, and data bits in the plurality of first data streams jointly form a first data set in the first frequency band. The first elements in the first data set may be corresponding data bits in the plurality of first data streams, or may be corresponding data bits in a certain first data stream. The at least one second data stream in the second frequency band is the same as that described above, and is not further described herein. The embodiment of the present disclosure has no limitation on the number of first data streams in the first frequency band and the number of second data streams in the second frequency band.

According to an embodiment, in the above operation S102, in a case where the first elements include the subcarrier information elements, and the second elements include the subcarrier information elements, before performing the interleaving operation, the method may further include the following operations. A bitstream is parsed into at least one first data stream and at least one second data stream, wherein the at least one first data stream is used for indicating at least one data stream in the first frequency band, and the at least one second data stream is used for indicating at least one data stream in the second frequency band. The at least one first data stream is modulated to obtain at least one first subcarrier information set, wherein the at least one first subcarrier information set is used for indicating at least one subcarrier information set to be interleaved in the first frequency band, and the at least one first subcarrier information set forms the first data set. The at least one second data stream is modulated to obtain at least one second subcarrier information set, wherein the at least one second subcarrier information set is used for indicating at least one subcarrier information set to be interleaved in the second frequency band, and the at least one second subcarrier information set forms the second data set.

It should be further noted that a correspondence exists between the first subcarrier information set and the first data stream, and between the second subcarrier information set and the second data stream. The first frequency band may include a plurality of first subcarrier information sets, and subcarrier information elements in the plurality of first subcarrier information sets form the first data set in the first frequency band. The first elements in the first data set may be corresponding subcarrier information elements in a plurality of first subcarrier information sets, or may be corresponding subcarrier information elements in a certain first subcarrier information set. The second subcarrier information set in the second frequency band is the same as that described above, and is not repeated herein. The embodiment of the present disclosure has no limitation on the number of the first subcarrier information sets in the first frequency band and the number of the second subcarrier information sets in the second frequency band.

According to an embodiment, in the operation S102, arranging the first elements and the second elements such that there is exchange of data between at least a part of the first elements and at least a part of the second elements may be implemented in the following manner. The first elements in the first data set are formed into a first data subset. The second elements in the second data set are formed into a second data subset. At least a part of the first elements in the first data subset is arranged into the second data set, and at least a part of the second elements in the second data subset is arranged into the first data set.

According to an embodiment, in the operation S102, arranging at least a part of the first elements in the first data subset into the second data set, and arranging at least a part of the second elements in the second data subset into the first data set may be implemented in the following manner. At least one first element is selected from any N continuous first elements in the first data subset, and the at least one first element is arranged into the second data set. At least one second element is selected from any N continuous second elements in the second data subset, and the at least one second element is arranged into the first data set. Herein, N is a preset value, and is obtained based on at least one of: a bandwidth of the first frequency band, a modulation and coding scheme of the at least one first data stream, a bandwidth of the second frequency band, a modulation and coding scheme of the at least one second data stream, a signal-to-noise ratio of a channel during signal transmission, a type of the channel during signal transmission, a range of frequency selective fading of the channel during signal transmission, the number of rows and columns of an interleaver array, a total number of frequency bands used for signal transmission, the number of first data streams in the first frequency band, and the number of second data streams in the second frequency band.

It should be further noted that N may be used for indicating the complexity of interleaving. The smaller the value of N is, the larger the frequency of selecting one or more corresponding first elements or one or more corresponding second elements from the first data subset and the second data subset is, and the higher the complexity of interleaving is. On the contrary, the larger the value of N is, the lower the complexity of interleaving is. Therefore, the value of N may also substantially indicate the capability of the wireless communication system to resist frequency selective fading of signals. When a requirement of the system for the capability of resisting the frequency selective fading of signals is relatively large, the value of N is reduced; and when the requirement of the system for the capability of resisting the frequency selective fading of signals is relatively small, the value of N is appropriately increased.

According to an embodiment, the operation S102 may further include the following operations. A relationship between a position index of each first element before the interleaving operation and a position index of the first element after the interleaving operation is obtained according to at least one of: a bandwidth of the first frequency band, a modulation and coding scheme of the at least one first data stream, a bandwidth of the second frequency band, a modulation and coding scheme of the at least one second data stream, a signal-to-noise ratio of a channel during signal transmission, a type of the channel during signal transmission, a range of frequency selective fading of the channel during signal transmission, the number of rows and columns of an interleaver array, a total number of frequency bands used for signal transmission, the number of first data streams in the first frequency band, and the number of second data streams in the second frequency band. A relationship between a position index of each second element before the interleaving operation and a position index of the second element after the interleaving operation is obtained according to at least one of: a bandwidth of the first frequency band, a modulation and coding scheme of the at least one first data stream, a bandwidth of the second frequency band, a modulation and coding scheme of the at least one second data stream, a signal-to-noise ratio of a channel during signal transmission, a type of the channel during signal transmission, a range of frequency selective fading of the channel during signal transmission, the number of rows and columns of an interleaver array, a total number of frequency bands used for signal transmission, the number of first data streams in the first frequency band, and the number of second data streams in the second frequency band.

It should be further noted that the position index of the first element before the interleaving operation is used for indicating a specific position of the first element in the first data set before the interleaving operation is performed, and the position index of the first element after the interleaving operation is used for indicating a specific position of the first element in the first data set or in the second data set after the interleaving operation is performed. The relationship between the position index of the first element before the interleaving operation and the position index of the first element after the interleaving operation is described hereinafter with reference to exemplary embodiments.

According to an embodiment, the operation S102 may further include the following operations. The number M1 of the first elements in the first data subset is determined according to at least one of: a modulation and coding scheme of the data stream in the first frequency band, a bandwidth of the first frequency band, a total number of bits transmitted on the first frequency band, a modulation and coding scheme of the data stream in the second frequency band, a bandwidth of the second frequency band, and a total number of bits transmitted on the second frequency band. The number M2 of the second elements in the second data subset is determined according to at least one of: a modulation and coding scheme of the data stream in the first frequency band, a bandwidth of the first frequency band, a total number of bits transmitted on the first frequency band, a modulation and coding scheme of the data stream in the second frequency band, a bandwidth of the second frequency band, and a total number of bits transmitted on the second frequency band. The number m1 of the first elements arranged from the first data subset into the second data subset is determined according to at least one of: a bandwidth of the first frequency band, a modulation and coding scheme of the at least one first data stream, a bandwidth of the second frequency band, a modulation and coding scheme of the at least one second data stream, a signal-to-noise ratio of a channel during signal transmission, a type of the channel during signal transmission, a range of frequency selective fading of the channel during signal transmission, the number of rows and columns of an interleaver array, a total number of frequency bands used for signal transmission, the number of first data streams in the first frequency band, and the number of second data streams in the second frequency band. The number m2 of the second elements arranged from the second data subset into the first data subset is determined according to at least one of: a bandwidth of the first frequency band, a modulation and coding scheme of the at least one first data stream, a bandwidth of the second frequency band, a modulation and coding scheme of the at least one second data stream, a signal-to-noise ratio of a channel during signal transmission, a type of the channel during signal transmission, a range of frequency selective fading of the channel during signal transmission, the number of rows and columns of an interleaver array, a total number of frequency bands used for signal transmission, the number of first data streams in the first frequency band, and the number of second data streams in the second frequency band.

According to an embodiment, the operation S102 may further include the following operations. A value of $\alpha$ is obtained according to a preset performance of the interleaving operation. A value of $\beta 1$ and a value of $\beta 2$ are determined according to a, wherein a is used for indicating a ratio of the number M1 of the first elements in the first data subset and the number M2 of the second elements in the second data subset, i.e., $$\alpha = \frac{M1}{M2};$$

β1 is used for indicating a ratio of the number m1 of the first elements arranged from the first data subset into the second data subset and the number M1 of the first elements in the first data subset, i.e., $$\beta 1 = \frac{m1}{M1};$$

β2 is used for indicating a ratio of the number m2 of the second elements arranged from the second data subset into the number M2 of the second elements in the second data subset, i.e., $$\beta 2 = \frac{m2}{M2}.$$

It should be further noted that the values of β1 and β2 determine the performance of the inter-band interleaving in the present embodiment. The values of β1 and β2 are affected by the value of α, for example, when α is 1, the recommended values of β1 and β2 may be 0.5.

According to an embodiment, in the operation S102, the number of the first elements in the first data subset before the interleaving operation is the same as the number of the first elements in the first data subset after the interleaving operation, and the number of the second elements in the second data subset before the interleaving operation is the same as the number of the second elements in the second data subset after the interleaving operation.

It should be further noted that the number of the first elements in the first data subset remains unchanged before and after the interleaving operation, that is, the number of first elements arranged from the first data subset to the second data set is the same as the number of second elements arranged from the second data subset to the first data set. After the second elements arranged from the second data subset to the first data set are arranged into the first data set, these second elements become the first elements in the first data subset, therefore, the number of the first elements in the first data subset remains unchanged before and after the interleaving operation is performed. The second data subset and the second elements also follow the above rule, and are not repeated herein.

In order to facilitate further understanding of the wireless data communication method provided in the embodiments of the present disclosure, a data interleaving method is specifically described in the following with reference to FIGS. 5-9 through exemplary embodiments.

Figure 5:
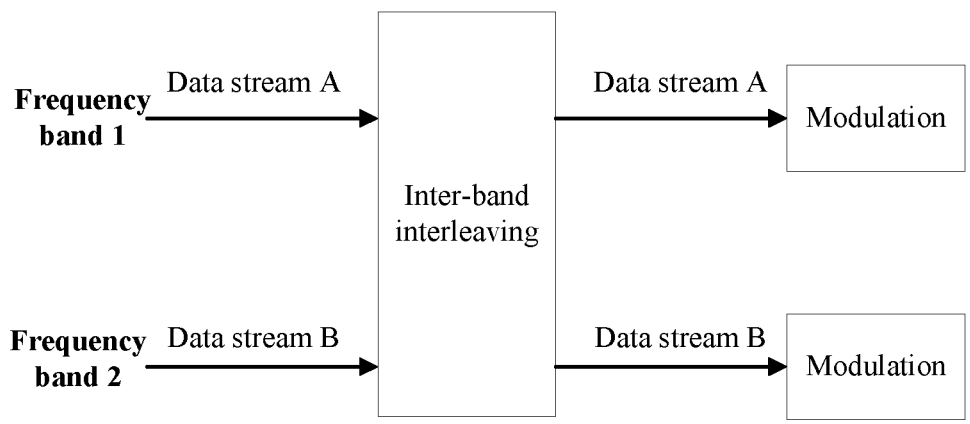
FIG. 5 is a flowchart of a wireless data communication method in a case of dual frequency bands and single data stream according to an exemplary embodiment of the present disclosure.

FIG. 5 is a flowchart of a wireless data communication method in a case of dual frequency bands and single data stream according to an exemplary embodiment of the present disclosure, Data is transmitted via two independent frequency bands, and one data stream is transmitted on each frequency band. As shown in FIG. 5, this exemplary embodiment involves two frequency bands, i.e., a frequency band 1 and a frequency band 2, in which there is a data stream A in the frequency band 1, and there is a data stream B in the frequency band 2. The data stream A contains M bits, and the data stream B contains N bits. The frequency band 1 corresponds to the first frequency band in the described embodiments, and the frequency band 2 corresponds to the second frequency band in the described embodiments. The data stream A corresponds to the first data stream in the described embodiments, and the data stream B corresponds to the second data stream in the described embodiments. M bits in the data stream A form a first data set, and N bits in the data stream B form a second data set. In the present embodiment, the interleaving of the first elements and the second elements is substantially the interleaving of the data stream A and the data stream B.

The interleaving method for the data stream A and the data stream B includes the following operations S1 to S4.

In the operation S1, m bits are selected from the data stream A, and n bits are selected from the data stream B, wherein the m bits are the first elements, the n bits are the second elements, and the ratio of m to n is α, i.e., $$\alpha = \frac{m}{n},$$

where the value of α depends on the parameter during actual data transmission, and the possible value includes α=1, ½, ⅔, ¼ . . .

In the operation S2, the m bits form a first data subset, and the n bits form a second data subset. S bits are extracted from the first data subset and are arranged at preset bit positions in the data stream B, and S bits are extracted from the second data subset and arranged at preset positions in the data stream A, wherein a ratio of S to m is β1, and a ratio of S to n is β2, i.e., $$\beta 1 = \frac{S}{m}, \beta 1 = \frac{S}{n}.$$

The values of β1 and β2 are related to α and also related to the interleaving method adopted. The values of m and n may be equal to S, or may not be equal to S. The remaining bits other than S in m and n may be returned to the corresponding data stream A and data stream B respectively, and the exemplary embodiment does not limit the specific positions corresponding to the bits returned to the data stream A and data stream B.

It should be noted that the number of bits of the data stream A before and after the interleaving is M, and the number of bits of the data stream B before and after the interleaving is N.

In the operation S3, the above operations S1 to S2 are repeated until all the bits in the data stream A and the data stream B before the next round of interleaving operation have already been interleaved.

In the foregoing operation S3, the bits in the data stream A and the data stream B are also suggested to meet at least one of the following conditions: any two adjacent bits in the data stream A before the interleaving operation are respectively located in the data stream A and the data stream B after the interleaving operation is completed, that is, for any two adjacent bits in the data stream A before the interleaving operation, after the interleaving operation is completed, one bit is located in the data stream A, and the other bit is in the data stream B; any two adjacent bits in the data stream A before the interleaving operation are located in the data stream A or the data stream B after the interleaving operation is completed, and an interval between corresponding bit positions of the two bits in the data stream A or the data stream B after the interleaving operation is completed is larger than a preset threshold, that is, any two adjacent bits in the data stream A before the interleaving operation are both located in the data stream A or the data stream B after the interleaving operation is completed, and an interval between the bit positions of the bits after the interleaving operation is completed is larger than a preset threshold value. The foregoing preset threshold is used for indicating a capability of the wireless communication system to resist frequency selective fading of signals.

Figure 6:
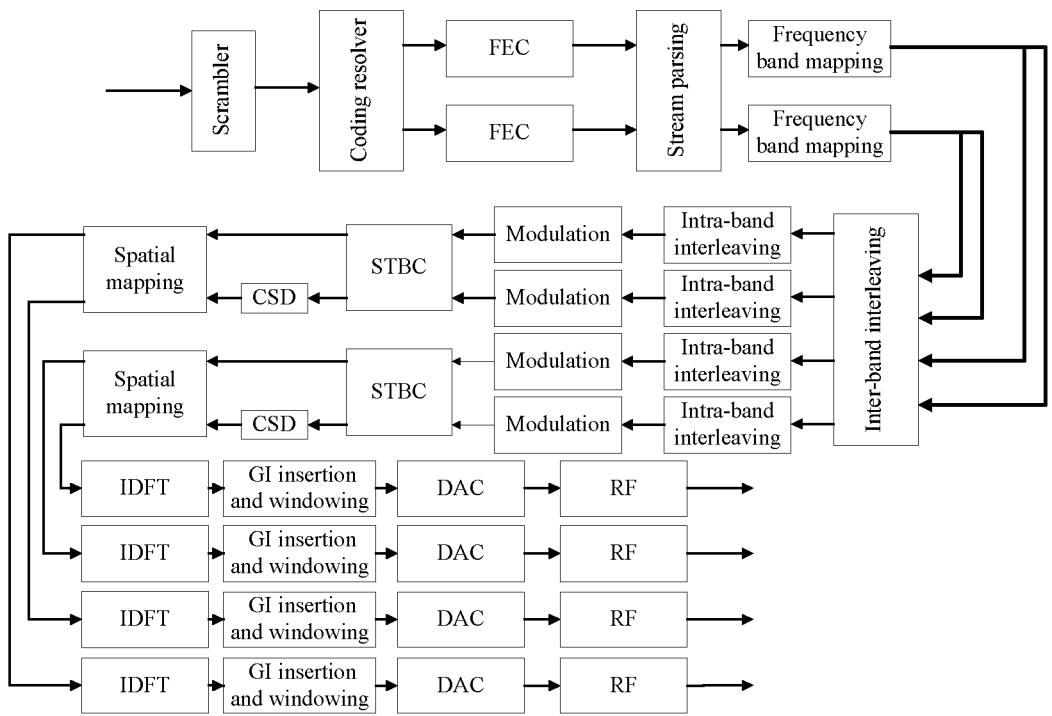
FIG. 6 is a flowchart of a wireless data communication method in a case of dual frequency bands and dual data streams according to an exemplary embodiment of the present disclosure.

FIG. 6 is a flowchart of a wireless data communication method in a case of dual frequency bands and dual data streams according to an exemplary embodiment of the present disclosure. As shown in FIG. 6, in this exemplary embodiment, data is transmitted via two frequency bands. For data transmitted on each frequency band, coded bits may be parsed into two data streams by using a stream parser. Each data stream may be represented in the following manner: $S_{i,j} \in \{S_{1,1}, S_{1,2}, S_{2,1}, S_{2,2}\}$, where i is used for indicating an index of the frequency band, and in the present embodiment, i=0,1; j is used for indicating an index of the data stream, and j=0.1 in the present embodiment; and $S_{i,j}$ is used for indicating the jth data stream to be transmitted corresponding to the ith frequency band.

$S_{1,1}$ and $S_{1,2}$ are the first data streams in the foregoing embodiment, and the first frequency band corresponds to two first data streams. $S_{2,1}$ and $S_{2,2}$ are the second data streams in the foregoing embodiment, and the second frequency band corresponds to two second data streams. The data bits in $S_{1,1}$ and $S_{1,2}$ form the first data set in the foregoing embodiment, and the data bits in $S_{2,1}$ and $S_{2,2}$ form the second data set in the foregoing embodiment.

According to a bandwidth and an actual operating condition of each frequency band, an MCS (Modulation and Coding Scheme) corresponding to each frequency band may be determined, so as to obtain the number of bits that can be carried by a single OFDM (Orthogonal Frequency Division Multiplexing) symbol in each frequency band, which is denoted as $N_{CBPS}^i$, where $N_{CBPS}^i \in \{N_{CBPS}^1, N_{CBPS}^2\}$. In the foregoing expression, $N_{CBPS}^i$ is used for indicating the number of bits that can be carried by each OFDM symbol in the ith frequency band. The number of bits corresponding to each frequency band may be a multiple of $N_{CBPS}^i$.

The operation operations of the inter-band interleaving in this exemplary embodiment include the following operations S1 to S5.

In the operation S1, $N_{CBPS}^i$ bits are extracted from a data stream $S_{i,j}$, and the $N_{CBPS}^i$ bits form a bit set S, wherein the total number N of the bits in S is $$N = \delta \cdot \sum_i \lambda_i \cdot N_{CBPS}^i$$

($\lambda_i$ is the number of data streams corresponding to the frequency band, $\delta$ is a coefficient, and the numerical value of $\delta$ depends on the specific implementation). In this exemplary embodiment, i=0,1; j=0,1; and $\delta$=1, therefore, the total number N of bits in S is $N=2\times N_{CBPS}^1 + 2\times N_{CBPS}^2$.

In the operation S2, all the bits in the bit set S are numbered, and a location index of each of the bits is denoted as k. In the present embodiment, k=0,1,2,3, . . . , N−1. It should be noted that, the setting of the foregoing bit set S is only one manner in a process of arranging the bits, and is not a necessary means for arranging the bits. The setting of the bit set S is not limited in the present disclosure.

In the operation S3, the bits in the bit set S are arranged and the positions of the arranged bits are determined.

Assuming that the bit position index after the arrangement of the bits is set as K, the position exchange of the bits in the arranging process may be determined according to the following formula:

$$K = N_{ROW}(k \bmod N_{COL}) + \left\lfloor \frac{k}{N_{COL}} \right\rfloor.$$

In the above formula, $N_{COL}$ represents the number of columns of the interleaving matrix, $N_{COL}$ complies with the following condition:

$$\frac{\sqrt{2N}}{2} < N_{COL} < \sqrt{N},$$

and $N_{COL}$ is a multiple of N. The value of $N_{COL}$ is a maximum value satisfying the above two conditions. In the above formula, mod is used for indicating a modulus operation. In the above formula, $N_{ROW}$ complies with the following formula:

$$N_{ROW} = \frac{N}{N_{COL}},$$

and $N_{ROW}$ is an integer. In the above formula, k is a position index of the first element or the second element before the interleaving operation in the present embodiment, and K is a position index of the first element or the second element after the interleaving operation in the present embodiment.

In the operation S4, according to the bit positions corresponding to the bits obtained in S3, the bits are rearranged into the corresponding data stream, so as to complete the interleaving operation for the data stream.

In the operation S5, the above operations S1 to S4 are repeated until the bits in the data stream before the interleaving operation have all been interleaved.

Likewise, in the operation S5, bits in the data stream after the interleaving operation are suggested to meet at least one of the following conditions: any two adjacent bits in the data stream before the interleaving operation are located in data streams corresponding to different frequency bands after the interleaving operation is completed; any two adjacent bits in the data stream A before the interleaving operation are located in a data stream corresponding to a same frequency band after the interleaving operation is completed, and an interval between corresponding bit positions of the two bits in the data stream after the interleaving operation is completed is larger than a preset threshold.

It should be further noted that, the adjusting method in the operation S3 is only a method proposed in this exemplary embodiment, and the present disclosure does not limit a specific adjusting manner for bit positions in the bit set.

Figure 7:
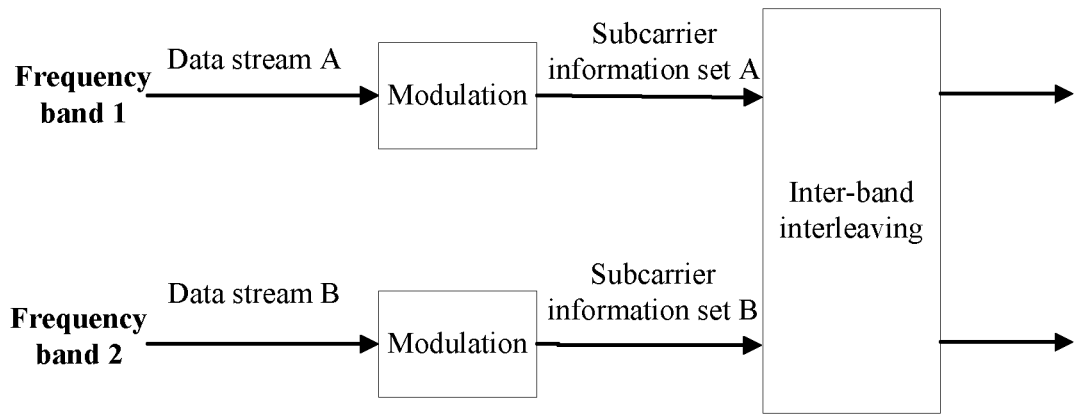
FIG. 7 is a flowchart of a wireless data communication method in a case of dual frequency bands and single subcarrier information set according to an exemplary embodiment of the present disclosure.

FIG. 7 is a flowchart of a wireless data communication method in a case of dual frequency bands and single subcarrier information set according to an exemplary embodiment of the present disclosure. As shown in FIG. 7, the present embodiment involves two frequency bands, i.e., a frequency band 1 and a frequency band 2, there is one data stream in each of the frequency band 1 and the frequency band 2, for example, there is a data stream A in the frequency band 1 and there is a data stream B in the frequency band 2. The data stream A is modulated to obtain a subcarrier information set A, and the data stream B is modulated to obtain a subcarrier information set B. The subcarrier information set A contains M elements, and the subcarrier information set B contains N elements. The frequency band 1 corresponds to the first frequency band in the foregoing embodiment, and the frequency band 2 corresponds to the second frequency band in the foregoing embodiment. The subcarrier information set A corresponds to the first subcarrier information set in the foregoing embodiment, and the subcarrier information set B corresponds to the second subcarrier information set in the foregoing embodiment. M subcarrier information elements in the subcarrier information set A form a first data set, and N subcarrier information elements in the subcarrier information set B form a second data set. In the foregoing embodiment, the interleaving of the first element and the second element is essentially the interleaving between the subcarrier information set A and the subcarrier information set B.

The interleaving operation between the subcarrier information set A and the subcarrier information set B includes the following operations S1 to S4.

In the operation S1, m subcarrier information elements are selected from the subcarrier information set A, and n subcarrier information elements are selected from the subcarrier information set B, wherein the m subcarrier information elements are the first elements, the n subcarrier information elements are the second elements, and the ratio of m to n is α, i.e., $$\alpha = \frac{m}{n},$$

where the value of α depends on the parameter during actual data transmission, and the possible value includes α=1, ½, ⅔, ¼ . . .

In the operation S2, the m subcarrier information elements form a first data subset, and the n subcarrier information elements form a second data subset. S subcarrier information elements are extracted from the first data subset and arranged at preset subcarrier information element positions in the subcarrier information set B. S subcarrier information elements are extracted from the second data subset and arranged at preset subcarrier information element positions in the subcarrier information set A. The ratio of S to m is β1, the ratio of S to n is β2, i.e., $$\beta 1 = \frac{S}{m}, \beta 1 = \frac{S}{n}.$$

The values of β1 and β2 are related to α and also related to the interleaving method adopted. Both m and n may be unequal to S. The remaining subcarrier information elements other than S in m and n may be respectively returned to the corresponding subcarrier information sets A and B, and the exemplary embodiment does not limit the specific return positions corresponding to the subcarrier information elements returned to the subcarrier information set A and the subcarrier information set B.

In the operation S3, the number of the subcarrier information elements of the subcarrier information set A before and after the interleaving is m, and the number of the subcarrier information elements of the subcarrier information set B before and after the interleaving is n.

In the operation S4, the above operations S1 to S3 are repeated until all elements in the subcarrier information set A and the subcarrier information set B before the next round of interleaving operation have already been interleaved.

In the operation S4, the elements in the subcarrier information set A and the subcarrier information set B also need to meet at least one of the following conditions: any two adjacent elements in the subcarrier information set A before the interleaving operation are located respectively in the subcarrier information set A and the subcarrier information set B after the interleaving operation is completed, that is, in any two adjacent elements of the subcarrier information set A before the interleaving operation, one of the two adjacent elements is located in the subcarrier information set A after the interleaving operation is completed, the other one of the two adjacent elements is located in the subcarrier information set B after the interleaving operation is completed; any two adjacent elements in the subcarrier information set A before the interleaving operation are located in the subcarrier information set A or the subcarrier information set B after the interleaving operation is completed, and an interval between corresponding element positions of the two elements in the subcarrier information set A or the subcarrier information set B after the interleaving operation is completed is larger than a preset threshold, that is, both of any two adjacent elements in the subcarrier information set A before the interleaving operation are located in the subcarrier information set A or in the subcarrier information set B after the interleaving operation is completed, and an interval between element positions of the two elements is larger than a preset threshold value after the interleaving operation is completed. The described preset threshold is used for indicating the capability of the wireless communication system to resist the frequency selective fading of signals.

Figure 8:
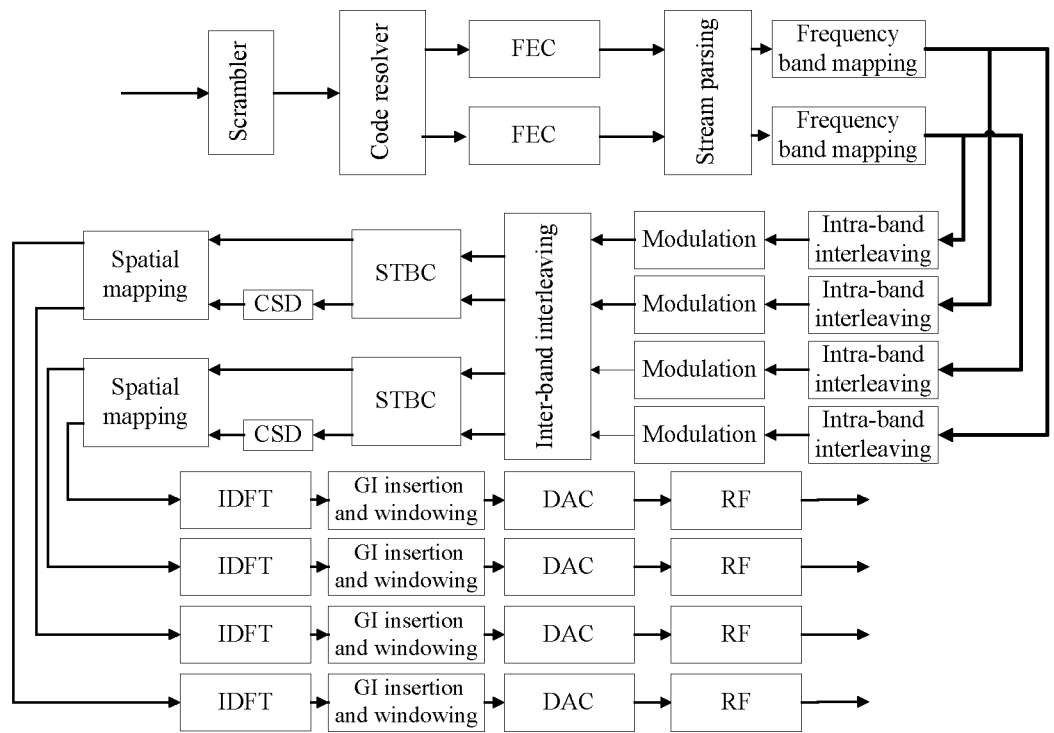
FIG. 8 is a first flowchart of a wireless data communication method in a case of dual frequency bands and dual subcarrier information sets according to an exemplary embodiment of the present disclosure.

FIG. 8 is a first flowchart of a wireless data communication method in a case of dual frequency bands and dual subcarrier information sets according to an exemplary embodiment of the present disclosure. As shown in FIG. 8, in this exemplary embodiment, data is transmitted via two frequency bands. For data transmitted on each frequency band, coded bits may be parsed into two data streams by using a stream parser. Each data stream may be represented in the following manner: $S_{i,j} \in \{S_{1,1}, S_{1,2}, S_{2,1}, S_{2,2}\}$, where i is used for indicating an index of the frequency band, and i=0,1 in the present embodiment; j is used for indicating an index of the data stream, and j=0,1 in the present embodiment; $S_{i,j}$ is used for indicating the jth data stream to be transmitted corresponding to the ith frequency band.

After in-band interleaving and modulation on each data stream, four subcarrier information sets can be obtained, which are denoted as: $C_{i,r} \in \{C_{1,1}, C_{1,2}, C_{2,1}, C_{2,2}\}$; wherein $C_{i,r}$ is used for indicating the jth subcarrier information set correspondingly transmitted on the ith frequency band. $C_{1,1}$ and $C_{1,2}$ are the first subcarrier information sets in the described embodiments, the first frequency band corresponds to two first subcarrier information sets. $C_{2,1}$ and $C_{2,2}$ are the second subcarrier information sets in the described embodiments, and the second frequency band corresponds to two second subcarrier information sets. The subcarrier information elements in $C_{1,1}$ and $C_{1,2}$ form a first data set, and the subcarrier information elements in $C_{2,1}$ and $C_{2,2}$ form a second data set.

According to the bandwidth of each frequency band and an actual operating condition, an MCS corresponding to each frequency band may be determined, so as to obtain the number of bits that can be carried by a single OFDM symbol in each frequency band, which is denoted as $N_{SD}^i$, where $N_{SD}^i \in \{N_{SD}^1, N_{SD}^2\}$. In the foregoing expression, $N_{SD}^i$ is used for indicating the number of bits that can be carried by each OFDM symbol on the ith frequency band. The number of corresponding subcarrier information elements in each frequency band may be a multiple of $N_{SD}^i$.

The operations of the inter-band interleaving operation in this exemplary embodiment include the following operations S1 to S5.

In the operation S1, $N_{SD}^i$ subcarrier information elements are extracted from the data stream $C_{i,r}$, and the $N_{SD}^i$ subcarrier information elements form a subcarrier information element set S, wherein the total number N of the subcarrier information elements in S is $$N = \delta \cdot \sum_i \beta_i \cdot N_{SD}^i$$

($\beta_i$ is the number of data streams corresponding to the frequency band, $\delta$ is a coefficient, and the numerical size of $\delta$ depends on the specific implementation). In this exemplary embodiment, i=0,1; j=0,1; and $\delta$=1, therefore, the total number N of the subcarrier information elements in S is $N=2\times N_{SD}^1 + 2\times N_{SD}^2$.

In the operation S2, all the subcarrier information elements in the subcarrier information element set S are numbered, and a position index of each of the subcarrier information elements is denoted as k. In the present embodiment, k=0,1,2,3, . . . , N−1. It should be noted that, the setting of the foregoing subcarrier information element set S is only one manner in a process of allocating the subcarrier information elements, and is not a necessary means for allocating the subcarrier information elements. The setting of the subcarrier information element set S is not limited in the present disclosure.

In the operation S3, the corresponding subcarrier information element positions when allocating the subcarrier information elements in the subcarrier information element set S during the interleaving operation are determined. The position index of the subcarrier information element when allocating the subcarrier information element is set as K, and the position exchange of the subcarrier information elements in the allocating process may be determined according to the following formula:

$$K = N_{ROW}(k \bmod N_{COL}) + \left\lfloor \frac{k}{N_{COL}} \right\rfloor.$$

In the above formula, $N_{COL}$ is used for indicating a preset capacity of resistance to the frequency selective fading, and $N_{COL}$ complies with the following conditions:

$$\frac{\sqrt{2N}}{2} < N_{COL} < \sqrt{N},$$

and the value of $N_{COL}$ is a multiple of N. The value of $N_{COL}$ is a maximum value satisfying the above two conditions. In the above formula, mod is used for indicating a modulus operation. In the above formula, $N_{ROW}$ complies with the following formula:

$$N_{ROW} = \frac{N}{N_{COL}}.$$

In the present embodiment, k is a position index of the first element or the second element before interleaving, and K is a position index of the first element or the second element after interleaving.

In the operation S4, according to the bit positions corresponding to the subcarrier information elements obtained in S3, the subcarrier information elements are reallocated to the corresponding subcarrier information set, so as to complete the interleaving operation for the subcarrier information set.

In the operation S5, the above operations S1 to S4 are repeated until the subcarrier information elements in the subcarrier information set before the interleaving operation have all been interleaved.

Likewise, in the operation S5, the subcarrier information elements in the subcarrier information set after the interleaving operation are suggested to meet at least one of the following conditions: any two adjacent subcarrier information elements in the subcarrier information set before the interleaving operation are respectively located in subcarrier information sets corresponding to different frequency bands after the interleaving operation; any two adjacent subcarrier information elements in the subcarrier information set before the interleaving operation are located in the subcarrier information set corresponding to the same frequency band after the interleaving operation is completed, and the interval between the subcarrier information element positions corresponding to the two subcarrier information elements in the subcarrier information set after the interleaving operation is completed is larger than a preset threshold value.

It should be further noted that the adjusting method in the operation S3 is only a method proposed in this exemplary embodiment, and the present disclosure does not limit a specific adjusting method for subcarrier information element positions in the subcarrier information element set.

Figure 9:
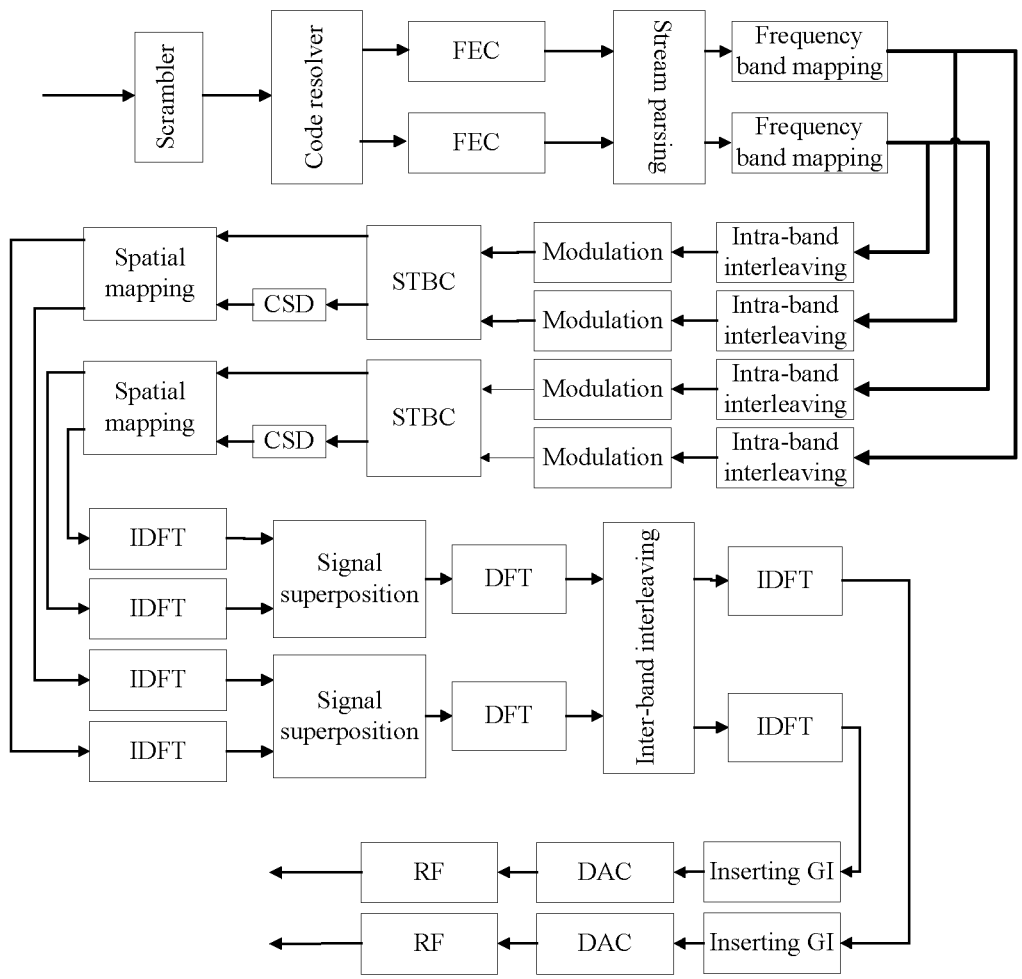
FIG. 9 is a second flowchart of a wireless data communication method in a case of dual frequency bands and dual subcarrier information sets according to an exemplary embodiment of the present disclosure.

FIG. 9 is a second flowchart of a wireless data communication method in a case of dual frequency bands and dual subcarrier information sets according to an exemplary embodiment of the present disclosure. As shown in FIG. 9, in this exemplary embodiment, data is transmitted via two frequency bands. For data transmitted on each frequency band, coded bits may be parsed into two data streams by using a stream parser. Each data stream may be represented in the following manner: $S_{i,j} \in \{S_{1,1}, S_{1,2}, S_{2,1}, S_{2,2}\}$, where i is used for indicating an index of the frequency band, and i=0,1 in the present embodiment; j is used for indicating an index of the data stream, and j=0,1 in the present embodiment; $S_{i,j}$ is used for indicating the jth data stream to be transmitted corresponding to the ith frequency band.

After in-band interleaving and modulation on each data stream, four subcarrier information sets can be obtained, which are denoted as: $C_{i,r} \in \{C_{1,1}, C_{1,2}, C_{2,1}, C_{2,2}\}$, wherein $C_{i,r}$ is used for indicating a jth subcarrier information set correspondingly transmitted in the ith frequency band.

$C_{1,1}$ and $C_{1,2}$ mentioned above are the first subcarrier information sets in the described embodiments, and the first frequency band corresponds to two first subcarrier information sets. $C_{2,1}$ and $C_{2,2}$ mentioned above are the second subcarrier information sets in the described embodiments, and the second frequency band corresponds to two second subcarrier information sets.

After the foregoing subcarrier information set is subjected to subsequent space-time encoding, spatial mapping and inverse Fourier transform, a time-domain signal of each data stream can be obtained, and then time-domain signals transmitted in the same frequency band are superposed to obtain a corresponding superposed time-domain signal for each frequency band. Fourier transform is performed on the time domain signal of each frequency band to obtain two sets of subcarrier information sets, which are denoted as $D_i$, wherein $D_i \in \{D_1, D_2\}$. $D_1$ corresponds to the frequency band 1, $D_2$ corresponds to the frequency band 2, and $D_1$ and $D_2$ respectively carry information after superposition of all data streams transmitted by the respective corresponding bands. The subcarrier information elements in $D_1$ form the first data set in the present embodiment, and the subcarrier information elements in $D_2$ form the second data set in the present embodiment.

According to the bandwidth of each frequency band and an actual operating condition, an MCS corresponding to each frequency band may be determined, so as to obtain the number of bits that can be carried by a single OFDM symbol in each frequency band, which is denoted as $N_{SD}^i$, where $N_{SD}^i \in \{N_{SD}^1, N_{SD}^2\}$. In the foregoing expression, $N_{SD}^i$ is used for indicating the number of bits that can be carried by each OFDM symbol on the ith frequency band. The number of corresponding subcarrier information elements in each frequency band may be a multiple of $N_{SD}^i$.

The operations of the inter-band interleaving operation in this exemplary embodiment include the following operations S1 to S5.

In the operation S1, $N_{SD}^i$ bits are extracted from the data stream $D_i$, and all the extracted subcarrier information elements form a subcarrier information element set S, wherein the total number N of the subcarrier information elements in the S is $$N = \sum_i \beta_i \cdot N_{SD}^i$$

($\beta_i$ is the number of data streams corresponding to the frequency band). In this exemplary embodiment, i=0,1; j=0,1, therefore, the total number N of the subcarrier information elements in S is $N=2 \times N_{SD}^1 + 2 \times N_{SD}^2$.

In the operation S2, all the subcarrier information elements in the subcarrier information element set S are numbered, and a position index of each of the subcarrier information elements is denoted as k. In the present embodiment, k=0,1,2,3, ..., N−1. It should be noted that, the setting of the foregoing set is only one manner in a process of allocating the subcarrier information elements, and is not a necessary means for allocating the subcarrier information elements. The setting of the subcarrier information element set S is not limited in the present disclosure.

In the operation S3, the corresponding subcarrier information element positions when allocating the subcarrier information elements in the subcarrier information element set S during the interleaving operation are determined. The position index of the subcarrier information element when allocating the subcarrier information element is set as K, and the position exchange of the subcarrier information elements in the allocating process may be determined according to the following formula:

$$K = N_{ROW}(k \bmod N_{COL}) + \left\lfloor \frac{k}{N_{COL}} \right\rfloor.$$

In the above formula, $N_{COL}$ represents the number of columns of the interleaving matrix, $N_{COL}$ complies with the following condition:

$$\frac{\sqrt{2N}}{2} < N_{COL} < \sqrt{N},$$

and the value of $N_{COL}$ is a multiple of N. The value of $N_{COL}$ is a maximum value satisfying the above two conditions. In the above formula, mod is used for indicating a modulus operation. In the above formula, $N_{ROW}$ complies with the following formula:

$$N_{ROW} = \frac{N}{N_{COL}},$$

and $N_{ROW}$ is an integer. The foregoing k is a position index of the first element or the second element before interleaving in the present embodiment, and K is a position index of the first element or the second element after interleaving in the present embodiment.

In the operation S4, according to the bit positions corresponding to the subcarrier information elements obtained in S3, the subcarrier information elements are reallocated to the corresponding subcarrier information set, so as to complete the interleaving operation for the subcarrier information set.

In the operation S5, the above operations S1 to S4 are repeated until the subcarrier information elements in the subcarrier information set before the interleaving operation have all been interleaved.

Likewise, in the operation S5, the subcarrier information elements in the subcarrier information set after the interleaving operation are suggested to meet at least one of the following conditions: any two adjacent subcarrier information elements in the subcarrier information set before the interleaving operation are located respectively in subcarrier information sets corresponding to different frequency bands after the interleaving operation; any two adjacent subcarrier information elements in the subcarrier information set before the interleaving operation are located in the subcarrier information set corresponding to the same frequency band after the interleaving operation is completed, and the interval between the subcarrier information element positions corresponding to the two subcarrier information elements in the subcarrier information set after the interleaving operation is completed is larger than a preset threshold value.

It should be further noted that the adjusting method in the operation S3 is only a method proposed in the present exemplary embodiment, and the present disclosure does not limit a specific adjusting method for subcarrier information element positions in the subcarrier information element set.

Through the description of the above implementations, those having ordinary skill in the art can understand that the method according to the above embodiment may be implemented by means of software plus a necessary general hardware platform, and of course, may also be implemented through hardware, but in many cases, the former is a better implementation. Based on such understanding, the essence of technical solution of the embodiments of the present disclosure, or in other words, the part of the technical solutions making contributions to the conventional art, may be embodied in the form of a software product stored in a storage medium (such as a Read-Only Memory (ROM)/

Random Access Memory (RAM), a magnetic disk and an optical disc), including a number of instructions for enabling a terminal device (which may be a mobile phone, a computer, a server, or a network device, etc.) to perform the methods described in various embodiments of the present disclosure.

In another embodiment, a data interleaving device is provided. The device is used to implement the above embodiments and exemplary implementations, and the details having been described will not be repeated. As used below, the term "module" may implement a combination of software and/or hardware of a predetermined function. Although the apparatus described in the following embodiments is preferably implemented in software, the implementation in hardware or a combination of software and hardware is also possible and contemplated.

Figure 10:
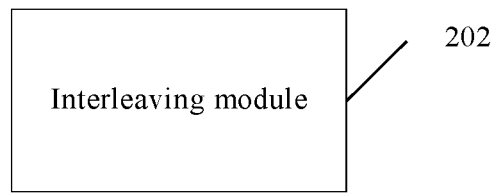
FIG. 10 is a structural block diagram of a wireless data communication device according to an embodiment of the present disclosure.

FIG. 10 is a structural block diagram of a wireless data communication device according to an embodiment of the present disclosure. As shown in FIG. 10, the device includes:

an interleaving module 202, configured to perform an interleaving operation on first elements in a first data set and second elements in a second data set; the interleaving operation includes: arranging the first elements and the second elements such that there is exchange of data between at least a part of the first elements and at least a part of the second elements, wherein the first data set belongs to a first frequency band, the second data set belongs to a second frequency band, and there is at least one second frequency band.

With the device in the present embodiment, the first elements in the first data set corresponding to the first frequency band and the second elements in the second data set corresponding to the second frequency band can be arranged to implement data exchange, thereby achieving the interleaving operation. The method in the present embodiment solves the problem that when data is transmitted via multiple frequency bands, data among multiple frequency bands cannot be interleaved. Meanwhile, through the data interleaving among the multiple frequency bands, system performance when the wireless device transmits signals via multiple frequency bands can be significantly improved.

According to an embodiment, in the interleaving module 202, the first elements include data bits or subcarrier information elements, the second elements include data bits or subcarrier information elements. The subcarrier information elements are used for indicating amplitude and/or phase information of one or more subcarriers.

According to an embodiment, the interleaving module 202 is further configured to perform the following operations before performing the interleaving operation in a case where the first elements include data bits and the second elements include data bits: parse a bitstream into at least one first data stream and at least one second data stream, wherein the at least one first data stream is used for indicating at least one data stream to be interleaved in the first frequency band, and the at least one second data stream is used for indicating at least one data stream to be interleaved in the second frequency band; wherein the at least one first data stream forms the first data set, and the at least one second data stream forms the second data set.

According to an embodiment, the interleaving module 202 is further configured to perform the following operations before performing the interleaving operation in a case where the first elements include the subcarrier information elements, and the second elements include the subcarrier information elements: parse a bitstream into at least one first data stream and at least one second data stream, wherein the at least one first data stream is used for indicating at least one data stream in the first frequency band, and the at least one second data stream is used for indicating at least one data stream in the second frequency band; modulating the at least one first data stream to obtain at least one first subcarrier information set, wherein the at least one first subcarrier information set is used for indicating at least one subcarrier information set to be interleaved in the first frequency band, and the at least one first subcarrier information set forms the first data set; modulating the at least one second data stream to obtain at least one second subcarrier information set, wherein the at least one second subcarrier information set is used for indicating at least one subcarrier information set to be interleaved in the second frequency band, and the at least one second subcarrier information set forms the second data set.

According to an embodiment, the interleaving module 202 is configured to arrange the first elements and the second elements such that there is exchange of data between at least a part of the first elements and at least a part of the second elements in a following manner: forming the first elements in the first data set into a first data subset; forming the second elements in the second data set into a second data subset; arranging at least a part of the first elements in the first data subset into the second data set, and arranging at least a part of the second elements in the second data subset into the first data set.

According to an embodiment, the interleaving module 202 is configured to arrange at least a part of the first elements in the first data subset into the second data set, and arranging at least a part of the second elements in the second data subset into the first data set in a following manner: selecting at least one first element from any N continuous first elements in the first data subset, and arranging the at least one first element into the second data set; selecting at least one second element from any N continuous second elements in the second data subset, and arranging the at least one second element into the first data set, wherein N is a preset value, and is obtained based on at least one of: a bandwidth of the first frequency band, a modulation and coding scheme of the at least one first data stream, a bandwidth of the second frequency band, a modulation and coding scheme of the at least one second data stream, a signal-to-noise ratio of a channel during signal transmission, a type of the channel during signal transmission, a range of frequency selective fading of the channel during signal transmission, the number of rows and columns of an interleaver array, a total number of frequency bands used for signal transmission, the number of first data streams in the first frequency band, and the number of second data streams in the second frequency band.

In an embodiment, the interleaving module 202 is further configured to obtain a relationship between a position index of each first element before the interleaving operation and a position index of the first element after the interleaving operation according to at least one of: a bandwidth of the first frequency band, a modulation and coding scheme of the at least one first data stream, a bandwidth of the second frequency band, a modulation and coding scheme of the at least one second data stream, a signal-to-noise ratio of a channel during signal transmission, a type of the channel during signal transmission, a range of frequency selective fading of the channel during signal transmission, the number of rows and columns of an interleaver array, a total number of frequency bands used for signal transmission, the number of first data streams in the first frequency band, and the number of second data streams in the second frequency band. In an embodiment, the interleaving module 202 is further configured to obtain a relationship between a position index of each second element before the interleaving operation and a position index of the second element after the interleaving operation according to at least one of: a bandwidth of the first frequency band, a modulation and coding scheme of the at least one first data stream, a bandwidth of the second frequency band, a modulation and coding scheme of the at least one second data stream, a signal-to-noise ratio of a channel during signal transmission, a type of the channel during signal transmission, a range of frequency selective fading of the channel during signal transmission, the number of rows and columns of an interleaver array, a total number of frequency bands used for signal transmission, the number of first data streams in the first frequency band, and the number of second data streams in the second frequency band.

In an embodiment, the interleaving module 202 is further configured to determine the number M1 of the first elements in the first data subset according to at least one of: a modulation and coding scheme of the data stream in the first frequency band, a bandwidth of the first frequency band, a total number of bits transmitted on the first frequency band, a modulation and coding scheme of the data stream in the second frequency band, a bandwidth of the second frequency band, and a total number of bits transmitted on the second frequency band. In an embodiment, the interleaving module 202 is further configured to determine the number M2 of the second elements in the second data subset according to at least one of: a modulation and coding scheme of the data stream in the first frequency band, a bandwidth of the first frequency band, a total number of bits transmitted on the first frequency band, a modulation and coding scheme of the data stream in the second frequency band, a bandwidth of the second frequency band, and a total number of bits transmitted on the second frequency band. In an embodiment, the interleaving module 202 is further configured to determine the number m1 of the first elements arranged from the first data subset into the second data subset according to at least one of: a bandwidth of the first frequency band, a modulation and coding scheme of the at least one first data stream, a bandwidth of the second frequency band, a modulation and coding scheme of the at least one second data stream, a signal-to-noise ratio of a channel during signal transmission, a type of the channel during signal transmission, a range of frequency selective fading of the channel during signal transmission, the number of rows and columns of an interleaver array, a total number of frequency bands used for signal transmission, the number of first data streams in the first frequency band, and the number of second data streams in the second frequency band. In an embodiment, the interleaving module 202 is further configured to determine the number m2 of the second elements arranged from the second data subset into the first data subset according to at least one of: a bandwidth of the first frequency band, a modulation and coding scheme of the at least one first data stream, a bandwidth of the second frequency band, a modulation and coding scheme of the at least one second data stream, a signal-to-noise ratio of a channel during signal transmission, a type of the channel during signal transmission, a range of frequency selective fading of the channel during signal transmission, the number of rows and columns of an interleaver array, a total number of frequency bands used for signal transmission, the number of first data streams in the first frequency band, and the number of second data streams in the second frequency band.

According to an embodiment, the interleaving module 202 is further configured to obtain a value of $\alpha$ according to a preset performance of the interleaving operation; determine a value of $\beta 1$ and a value of $\beta 2$ according to a, wherein a is used for indicating a ratio of the number M1 of the first elements in the first data subset and the number M2 of the second elements in the second data subset, i.e., $$\alpha = \frac{M1}{M2};$$

$\beta 1$ is used for indicating a ratio of the number m1 of the first elements arranged from the first data subset into the second data subset and the number M1 of the first elements in the first data subset, i.e., $$\beta 1 = \frac{m1}{M1};$$

$\beta 2$ is used for indicating a ratio of the number m2 of the second elements arranged from the second data subset into the number M2 of the second elements in the second data subset, i.e., $$\beta 2 = \frac{m2}{M2}.$$

In an embodiment, the interleaving module 202 is further configured to achieve the following condition: the number of the first elements in the first data subset before the interleaving operation is the same as the number of the first elements in the first data subset after the interleaving operation; the number of the second elements in the second data subset before the interleaving operation is the same as the number of the second elements in the second data subset after the interleaving operation.

It is to be noted that each of the above modules may be implemented by software or hardware. For the latter, the modules may be implemented by, but not limited to, either of the following manners: the above modules are all located in the same processor; or, the above modules are located in different processors in any combination form respectively.

Another embodiment of the present disclosure provides a storage medium. The storage medium stores a computer program, wherein the computer program is configured to execute the operations in any of the above method embodiments at runtime.

In the embodiment, the storage medium is configured to store the computer program configured to implement the following operations. An interleaving operation is performed on first elements in a first data set and second elements in a second data set. The interleaving operation includes: arranging the first elements and the second elements such that there is exchange of data between at least a part of the first elements and at least a part of the second elements, wherein the first data set belongs to a first frequency band, the second data set belongs to a second frequency band, and there is at least one second frequency band.

For a specific example in this embodiment, reference may be made to the example described in the foregoing embodiment, and details are not repeatedly described herein in this embodiment.

In the present embodiment, the storage medium may include, but is not limited to, a U disk, a Read-Only Memory (ROM for short), a Random Access Memory, (RAM for short), a mobile hard disk, a magnetic disk, or an optical disk, and any other medium that can store a computer program.

Still another embodiment of the present disclosure provides an electronic device including a memory and a processor. The memory stores a computer program, and the processor is configured to execute the computer program to perform the operations in any one of the method embodiments.

According to an embodiment, the electronic apparatus may further include a transmission device and an input/output device, wherein the transmission device is connected to the processor, and the input/output device is connected to the processor.

In this embodiment, the processor may be arranged to perform the following operation through executing a computer program. An interleaving operation is performed on first elements in a first data set and second elements in a second data set. The interleaving operation includes: arranging the first elements and the second elements such that there is exchange of data between at least a part of the first elements and at least a part of the second elements, wherein the first data set belongs to a first frequency band, the second data set belongs to a second frequency band, and there is at least one second frequency band.

Optionally, specific implementations for the present embodiment may refer to the examples described in the above embodiments and alternative implementations, and details are not repeated in the present embodiment.

It is apparent that a person skilled in the art shall understand that all of the above-mentioned modules or operations in the present disclosure may be implemented by using a general computation apparatus, may be centralized on a single computation apparatus or may be distributed on a network composed of multiple computation apparatuses. Optionally, they may be implemented by using executable program codes of the computation apparatuses. Thus, they may be stored in a storage apparatus and executed by the computation apparatuses, the shown or described operations may be executed in a sequence different from this sequence under certain conditions, or they are manufactured into each integrated circuit module respectively, or multiple modules or operations therein are manufactured into a single integrated circuit module. Thus, the embodiments of the present disclosure are not limited to any specific hardware and software combination.

The above is only the exemplary embodiments of the present disclosure, not intended to limit the present disclosure. As will occur to those having ordinary skill in the art, the present disclosure is susceptible to various modifications and changes. Any modifications, equivalent replacements, improvements and the like made within the principle of the present disclosure shall fall within the scope of protection of the present disclosure.

What is claimed is:

1. A wireless data communication method performed by a wireless data communication device, the method comprising:
    performing an interleaving operation on first elements in a first data set and second elements in a second data set;
    wherein the interleaving operation comprises: arranging the first elements and the second elements such that there is exchange of data between at least a part of the first elements and at least a part of the second elements;
    wherein the first data set belongs to a first frequency band, the second data set belongs to a second frequency band, and there is at least one second frequency band;
    wherein the first elements comprise data bits, and the second elements comprise the data bits, before performing the interleaving operation on the first elements in the first data set and the second elements in the second data set, the method further comprises: parsing a bitstream into at least one first data stream and at least one second data stream, wherein the at least one first data stream is used for indicating at least one data stream to be interleaved in the first frequency band, and the at least one second data stream is used for indicating at least one data stream to be interleaved in the second frequency band, wherein the at least one first data stream forms the first data set, and the at least one second data stream forms the second data set; or,
    wherein the first elements comprise subcarrier information elements, and the second elements comprise the subcarrier information elements, the subcarrier information elements are used for indicating amplitude and/or phase information of one or more subcarriers, before performing the interleaving operation on the first elements in the first data set and the second elements in the second data set, the method further comprises: parsing a bitstream into at least one first data stream and at least one second data stream, wherein the at least one first data stream is used for indicating at least one data stream in the first frequency band, and the at least one second data stream is used for indicating at least one data stream in the second frequency band; modulating the at least one first data stream to obtain at least one first subcarrier information set, wherein the at least one first subcarrier information set is used for indicating at least one subcarrier information set to be interleaved in the first frequency band, and the at least one first subcarrier information set forms the first data set; and modulating the at least one second data stream to obtain at least one second subcarrier information set, wherein the at least one second subcarrier information set is used for indicating at least one subcarrier information set to be interleaved in the second frequency band, and the at least one second subcarrier information set forms the second data set.

2. The method according to claim 1, wherein arranging the first elements and the second elements such that there is exchange of data between at least a part of the first elements and at least a part of the second elements:
    forming the first elements in the first data set into a first data subset;
    forming the second elements in the second data set into a second data subset; and
    arranging at least a part of the first elements in the first data subset into the second data set, and arranging at least a part of the second elements in the second data subset into the first data set.

3. The method according to claim 2, wherein arranging at least a part of the first elements in the first data subset into the second data set, and arranging at least a part of the second elements in the second data subset into the first data set comprises:
    selecting at least one first element from any N continuous first elements in the first data subset, and arranging the at least one first element into the second data set;

selecting at least one second element from any N continuous second elements in the second data subset, and arranging the at least one second element into the first data set;

wherein N is a preset value, and is obtained based on at least one of: a bandwidth of the first frequency band, a modulation and coding scheme of the at least one first data stream, a bandwidth of the second frequency band, a modulation and coding scheme of the at least one second data stream, a signal-to-noise ratio of a channel during signal transmission, a type of the channel during signal transmission, a range of frequency selective fading of the channel during signal transmission, the number of rows and columns of an interleaver array, a total number of frequency bands used for signal transmission, the number of first data streams in the first frequency band, and the number of second data streams in the second frequency band.

4. The method according to claim 2, further comprising:

obtaining a relationship between a position index of each first element before the interleaving operation and a position index of the first element after the interleaving operation according to at least one of: a bandwidth of the first frequency band, a modulation and coding scheme of the at least one first data stream, a bandwidth of the second frequency band, a modulation and coding scheme of the at least one second data stream, a signal-to-noise ratio of a channel during signal transmission, a type of the channel during signal transmission, a range of frequency selective fading of the channel during signal transmission, the number of rows and columns of an interleaver array, a total number of frequency bands used for signal transmission, the number of first data streams in the first frequency band, and the number of second data streams in the second frequency band;

obtaining a relationship between a position index of each second element before the interleaving operation and a position index of the second element after the interleaving operation according to at least one of: a bandwidth of the first frequency band, a modulation and coding scheme of the at least one first data stream, a bandwidth of the second frequency band, a modulation and coding scheme of the at least one second data stream, a signal-to-noise ratio of a channel during signal transmission, a type of the channel during signal transmission, a range of frequency selective fading of the channel during signal transmission, the number of rows and columns of an interleaver array, a total number of frequency bands used for signal transmission, the number of first data streams in the first frequency band, and the number of second data streams in the second frequency band.

5. The method according to claim 2, further comprising:

determining the number M1 of the first elements in the first data subset according to at least one of: a modulation and coding scheme of the data stream in the first frequency band, a bandwidth of the first frequency band, a total number of bits transmitted on the first frequency band, a modulation and coding scheme of the data stream in the second frequency band, a bandwidth of the second frequency band, and a total number of bits transmitted on the second frequency band;

determining the number M2 of the second elements in the second data subset according to at least one of: a modulation and coding scheme of the data stream in the first frequency band, a bandwidth of the first frequency band, a total number of bits transmitted on the first frequency band, a modulation and coding scheme of the data stream in the second frequency band, a bandwidth of the second frequency band, and a total number of bits transmitted on the second frequency band;

determining the number m1 of the first elements arranged from the first data subset into the second data subset according to at least one of: a bandwidth of the first frequency band, a modulation and coding scheme of the at least one first data stream, a bandwidth of the second frequency band, a modulation and coding scheme of the at least one second data stream, a signal-to-noise ratio of a channel during signal transmission, a type of the channel during signal transmission, a range of frequency selective fading of the channel during signal transmission, the number of rows and columns of an interleaver array, a total number of frequency bands used for signal transmission, the number of first data streams in the first frequency band, and the number of second data streams in the second frequency band;

determining the number m2 of the second elements arranged from the second data subset into the first data subset according to at least one of: a bandwidth of the first frequency band, a modulation and coding scheme of the at least one first data stream, a bandwidth of the second frequency band, a modulation and coding scheme of the at least one second data stream, a signal-to-noise ratio of a channel during signal transmission, a type of the channel during signal transmission, a range of frequency selective fading of the channel during signal transmission, the number of rows and columns of an interleaver array, a total number of frequency bands used for signal transmission, the number of first data streams in the first frequency band, and the number of second data streams in the second frequency band.

6. The method according to claim 5, further comprising:

obtaining a value of $\alpha$ according to a preset performance of the interleaving operation;

determining a value of $\beta 1$ and a value of $\beta 2$ according to $\alpha$;

wherein $\alpha$ is used for indicating a ratio of the number M1 of the first elements in the first data subset and the number M2 of the second elements in the second data subset, $$\alpha = \frac{M1}{M2};$$

$\beta 1$ is used for indicating a ratio of the number m1 of the first elements arranged from the first data subset into the second data subset and the number M1 of the first elements in the first data subset, $$\beta 1 = \frac{m1}{M1};$$

$\beta 2$ is used for indicating a ratio of the number m2 of the second elements arranged from the second data subset into the number M2 of the second elements in the second data subset, $$\beta 2 = \frac{m2}{M2}.$$

7. The method according to claim 2, further comprising:
the number of the first elements in the first data subset before the interleaving operation is the same as the number of the first elements in the first data subset after the interleaving operation;
the number of the second elements in the second data subset before the interleaving operation is the same as the number of the second elements in the second data subset after the interleaving operation.

8. The method according to claim 1, wherein arranging the first elements and the second elements such that there is exchange of data between at least a part of the first elements and at least a part of the second elements:
forming the first elements in the first data set into a first data subset;
forming the second elements in the second data set into a second data subset; and
arranging at least a part of the first elements in the first data subset into the second data set, and arranging at least a part of the second elements in the second data subset into the first data set.

9. The method according to claim 8, wherein arranging at least a part of the first elements in the first data subset into the second data set, and arranging at least a part of the second elements in the second data subset into the first data set comprises:
selecting at least one first element from any N continuous first elements in the first data subset, and arranging the at least one first element into the second data set;
selecting at least one second element from any N continuous second elements in the second data subset, and arranging the at least one second element into the first data set;
wherein N is a preset value, and is obtained based on at least one of: a bandwidth of the first frequency band, a modulation and coding scheme of the at least one first data stream, a bandwidth of the second frequency band, a modulation and coding scheme of the at least one second data stream, a signal-to-noise ratio of a channel during signal transmission, a type of the channel during signal transmission, a range of frequency selective fading of the channel during signal transmission, the number of rows and columns of an interleaver array, a total number of frequency bands used for signal transmission, the number of first data streams in the first frequency band, and the number of second data streams in the second frequency band.

10. The method according to claim 8, further comprising:
obtaining a relationship between a position index of each first element before the interleaving operation and a position index of the first element after the interleaving operation according to at least one of: a bandwidth of the first frequency band, a modulation and coding scheme of the at least one first data stream, a bandwidth of the second frequency band, a modulation and coding scheme of the at least one second data stream, a signal-to-noise ratio of a channel during signal transmission, a type of the channel during signal transmission, a range of frequency selective fading of the channel during signal transmission, the number of rows and columns of an interleaver array, a total number of frequency bands used for signal transmission, the number of first data streams in the first frequency band, and the number of second data streams in the second frequency band;
obtaining a relationship between a position index of each second element before the interleaving operation and a position index of the second element after the interleaving operation according to at least one of: a bandwidth of the first frequency band, a modulation and coding scheme of the at least one first data stream, a bandwidth of the second frequency band, a modulation and coding scheme of the at least one second data stream, a signal-to-noise ratio of a channel during signal transmission, a type of the channel during signal transmission, a range of frequency selective fading of the channel during signal transmission, the number of rows and columns of an interleaver array, a total number of frequency bands used for signal transmission, the number of first data streams in the first frequency band, and the number of second data streams in the second frequency band.

11. The method according to claim 8, further comprising:
determining the number M1 of the first elements in the first data subset according to at least one of: a modulation and coding scheme of the data stream in the first frequency band, a bandwidth of the first frequency band, a total number of bits transmitted on the first frequency band, a modulation and coding scheme of the data stream in the second frequency band, a bandwidth of the second frequency band, and a total number of bits transmitted on the second frequency band;
determining the number M2 of the second elements in the second data subset according to at least one of: a modulation and coding scheme of the data stream in the first frequency band, a bandwidth of the first frequency band, a total number of bits transmitted on the first frequency band, a modulation and coding scheme of the data stream in the second frequency band, a bandwidth of the second frequency band, and a total number of bits transmitted on the second frequency band;
determining the number m1 of the first elements arranged from the first data subset into the second data subset according to at least one of: a bandwidth of the first frequency band, a modulation and coding scheme of the at least one first data stream, a bandwidth of the second frequency band, a modulation and coding scheme of the at least one second data stream, a signal-to-noise ratio of a channel during signal transmission, a type of the channel during signal transmission, a range of frequency selective fading of the channel during signal transmission, the number of rows and columns of an interleaver array, a total number of frequency bands used for signal transmission, the number of first data streams in the first frequency band, and the number of second data streams in the second frequency band;
determining the number m2 of the second elements arranged from the second data subset into the first data subset according to at least one of: a bandwidth of the first frequency band, a modulation and coding scheme of the at least one first data stream, a bandwidth of the second frequency band, a modulation and coding scheme of the at least one second data stream, a signal-to-noise ratio of a channel during signal transmission, a type of the channel during signal transmission, a range of frequency selective fading of the channel during signal transmission, the number of rows and columns of an interleaver array, a total number of frequency bands used for signal transmission, the number of first data streams in the first frequency band, and the number of second data streams in the second frequency band.

12. The method according to claim 11, further comprising:
obtaining a value of α according to a preset performance of the interleaving operation;
determining a value of β1 and a value of β2 according to α;
wherein α is used for indicating a ratio of the number M1 of the first elements in the first data subset and the number M2 of the second elements in the second data subset, $$\alpha = \frac{M1}{M2};$$

β1 is used for indicating a ratio of the number m1 of the first elements arranged from the first data subset into the second data subset and the number M1 of the first elements in the first data subset, $$\beta1 = \frac{m1}{M1};$$

β2 is used for indicating a ratio of the number m2 of the second elements arranged from the second data subset into the number M2 of the second elements in the second data subset, $$\beta2 = \frac{m2}{M2}.$$

13. The method according to claim 8, further comprising:
the number of the first elements in the first data subset before the interleaving operation is the same as the number of the first elements in the first data subset after the interleaving operation;
the number of the second elements in the second data subset before the interleaving operation is the same as the number of the second elements in the second data subset after the interleaving operation.

14. The method according to claim 1, wherein bits in the first data stream and the second data stream meet at least one of the following conditions:
any two adjacent bits in the first data stream before the interleaving operation are respectively located in the first data stream and the second data stream after the interleaving operation is completed;
any two adjacent bits in the first data stream before the interleaving operation are located in the first data stream or the second data stream after the interleaving operation is completed, and an interval between corresponding bit positions of the two bits in the first data stream or the second data stream after the interleaving operation is completed is larger than a preset threshold.

15. The method according to claim 1, wherein elements in the first subcarrier information set and the second subcarrier information set meet at least one of the following conditions:
any two adjacent elements in the first subcarrier information set before the interleaving operation are located respectively in the first subcarrier information set and the second subcarrier information set after the interleaving operation is completed;
any two adjacent elements in the first subcarrier information set before the interleaving operation are located in the first subcarrier information set or the second subcarrier information set after the interleaving operation is completed, and an interval between corresponding element positions of the two elements in the first subcarrier information set or the second subcarrier information set after the interleaving operation is completed is larger than a preset threshold.

16. A wireless data communication device, comprising a memory storing instructions and a processor in communication with the memory, wherein the processor is configured to execute the instructions to:
perform an interleaving operation on first elements in a first data set and second elements in a second data set, wherein the interleaving operation comprises: arranging the first elements and the second elements such that there is exchange of data between at least a part of the first elements and at least a part of the second elements, the first data set belongs to a first frequency band, the second data set belongs to a second frequency band, and there is at least one second frequency band;
wherein the first elements comprise data bits, and the second elements comprise the data bits, before performing the interleaving operation on the first elements in the first data set and the second elements in the second data set, the processor is further configured to execute the instructions to: parse a bitstream into at least one first data stream and at least one second data stream, wherein the at least one first data stream is used for indicating at least one data stream to be interleaved in the first frequency band, and the at least one second data stream is used for indicating at least one data stream to be interleaved in the second frequency band, wherein the at least one first data stream forms the first data set, and the at least one second data stream forms the second data set; or,
wherein the first elements comprise subcarrier information elements, and the second elements comprise the subcarrier information elements, the subcarrier information elements are used for indicating amplitude and/or phase information of one or more subcarriers, before performing the interleaving operation on the first elements in the first data set and the second elements in the second data set, the processor is further configured to execute the instructions to: parse a bitstream into at least one first data stream and at least one second data stream, wherein the at least one first data stream is used for indicating at least one data stream in the first frequency band, and the at least one second data stream is used for indicating at least one data stream in the second frequency band; modulate the at least one first data stream to obtain at least one first subcarrier information set, wherein the at least one first subcarrier information set is used for indicating at least one subcarrier information set to be interleaved in the first frequency band, and the at least one first subcarrier information set forms the first data set; and modulate the at least one second data stream to obtain at least one second subcarrier information set, wherein the at least one second subcarrier information set is used for indicating at least one subcarrier information set to be interleaved in the second frequency band, and the at least one second subcarrier information set forms the second data set.

17. A non-transitory computer-readable storage medium, in which a computer program is stored, wherein the computer program, when being executed by a processor, is configured to cause the processor to:

perform an interleaving operation on first elements in a first data set and second elements in a second data set, wherein the interleaving operation comprises: arranging the first elements and the second elements such that there is exchange of data between at least a part of the first elements and at least a part of the second elements, the first data set belongs to a first frequency band, the second data set belongs to a second frequency band, and there is at least one second frequency band;

wherein the first elements comprise data bits, and the second elements comprise the data bits, before performing the interleaving operation on the first elements in the first data set and the second elements in the second data set, the processor is further configured to execute the instructions to: parse a bitstream into at least one first data stream and at least one second data stream, wherein the at least one first data stream is used for indicating at least one data stream to be interleaved in the first frequency band, and the at least one second data stream is used for indicating at least one data stream to be interleaved in the second frequency band, wherein the at least one first data stream forms the first data set, and the at least one second data stream forms the second data set; or, wherein the first elements comprise subcarrier information elements, and the second elements comprise the subcarrier information elements, the subcarrier information elements are used for indicating amplitude and/or phase information of one or more subcarriers, before performing the interleaving operation on the first elements in the first data set and the second elements in the second data set, the processor is further configured to execute the instructions to: parse a bitstream into at least one first data stream and at least one second data stream, wherein the at least one first data stream is used for indicating at least one data stream in the first frequency band, and the at least one second data stream is used for indicating at least one data stream in the second frequency band; modulate the at least one first data stream to obtain at least one first subcarrier information set, wherein the at least one first subcarrier information set is used for indicating at least one subcarrier information set to be interleaved in the first frequency band, and the at least one first subcarrier information set forms the first data set; and modulate the at least one second data stream to obtain at least one second subcarrier information set, wherein the at least one second subcarrier information set is used for indicating at least one subcarrier information set to be interleaved in the second frequency band, and the at least one second subcarrier information set forms the second data set.

* * * * *